(12) United States Patent
Ryu

(10) Patent No.: US 7,505,222 B2
(45) Date of Patent: *Mar. 17, 2009

(54) ALGORITHM TO DETECT THE TOUCH DOWN OF THE FLYING HEAD ON DISK

(75) Inventor: Benjamin Ryu, Cupertino, CA (US)

(73) Assignee: Samsung Electronics Co., Ltd., Suwon (KR)

(*) Notice: Subject to any disclaimer, the term of this patent is extended or adjusted under 35 U.S.C. 154(b) by 242 days.

This patent is subject to a terminal disclaimer.

(21) Appl. No.: 11/437,209

(22) Filed: May 19, 2006

(65) Prior Publication Data

US 2007/0268605 A1 Nov. 22, 2007

(51) Int. Cl.
*G11B 21/02* (2006.01)
*G11B 5/596* (2006.01)

(52) U.S. Cl. .......................................... 360/75; 360/69
(58) Field of Classification Search ...................... None
See application file for complete search history.

(56) References Cited

U.S. PATENT DOCUMENTS 7,095,587 B2 * 8/2006 Kurita et al. ................. 360/128
7,180,692 B1 * 2/2007 Che et al. ...................... 360/31
2007/0195449 A1 * 8/2007 Feist et al. .................... 360/75

FOREIGN PATENT DOCUMENTS

JP 11045436 A * 2/1999

* cited by examiner

*Primary Examiner*—Jason Olson
(74) *Attorney, Agent, or Firm*—Ben J. Yorks; Irell & Manella LLP

(57) ABSTRACT

A disk drive that contains a fly on demand head (FOD) and a process for determining contact between the FOD head and a disk. The head includes a heating coil that can receive various levels of power. The process may include a routine to determine head position estimate error data. Variance values for the estimate error data are generated for different power values and used to determine a contact point between the head and the disk. The process may also collect a plurality of signal amplification gain control (SAGC) signal values and compute an average of the SAGC values. Average SAGC values for different power levels can be generated and used to determine a contact point between the head and the disk.

40 Claims, 6 Drawing Sheets

ALGORITHM TO DETECT THE TOUCH DOWN OF THE FLYING HEAD ON DISK

BACKGROUND OF THE INVENTION

1. Field of the Invention

The present invention relates to hard disk drives and a method for determining a point of contact between a head and a disk for a head with a heater coil.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the flying height of the head.

The magnetic field detected by the head is inversely proportional to the flying height of the head. Likewise, the strength of the magnetic field written onto the disk is also inversely proportional to the fly height. A larger fly height will produce a weaker magnetic field on the disk.

Due to various reasons the flying height of the heads may vary during the operation of the drive. Such a variation in fly height may result in poorly written data on the disk. For example, weakly written data may create errors during a read routine. It is desirable to accurately determine and control the flying height of the heads in a disk drive.

There have been developed heads which include a heater coil. Current is provided to the heater coil to generate heat and thermally expand the head to move the read and write elements closer to the disk. These types of heads are sometimes referred to as fly on demand ("FOD") heads. The flying height of FOD heads can be varied by changing the amount of power provided to the heater coil.

It is desirable to create a flying height that is nearly zero. To achieve a minimum flying height it is desirable to know the point of contact between the head and the disk. Attempts to determine head contact have included monitoring the position error signal ("PES") of a servo routine in the drive. The results of such an approach are shown in FIG. 1. Such a curve has numerous maximis and minimis. Consequently, it is difficult to determine the point where the head makes contact with the disk.

BRIEF SUMMARY OF THE INVENTION

A hard disk drive with a head that includes a heater coil. The disk drive also includes a controller circuit that provides power to the heater coil and may perform a routine to determine estimate error data for the head and a variance of the estimate error data. The variance can be used to determine a point of contact between the head and the disk. In addition to, or alternatively, the routine may generate an average of a plurality of signal amplifier gain control signal (SAGC) values. The average of the SAGC signals can be used to determine a point of contact between the head and the disk.

DETAILED DESCRIPTION

Disclosed is a disk drive that contains a fly on demand head (FOD) and a process for determining contact between the FOD head and a disk. The head includes a heating coil that can receive various levels of power. The process may include a routine to determine head position estimate error data. Variance values for the estimate error data are generated for different power values and used to determine a contact point between the head and the disk. The process may also collect a plurality of signal amplification gain control (SAGC) signal values and compute an average of the SAGC values. Average SAGC values for different power levels can be generated and used to determine a contact point between the head and the disk.

Figure 2:
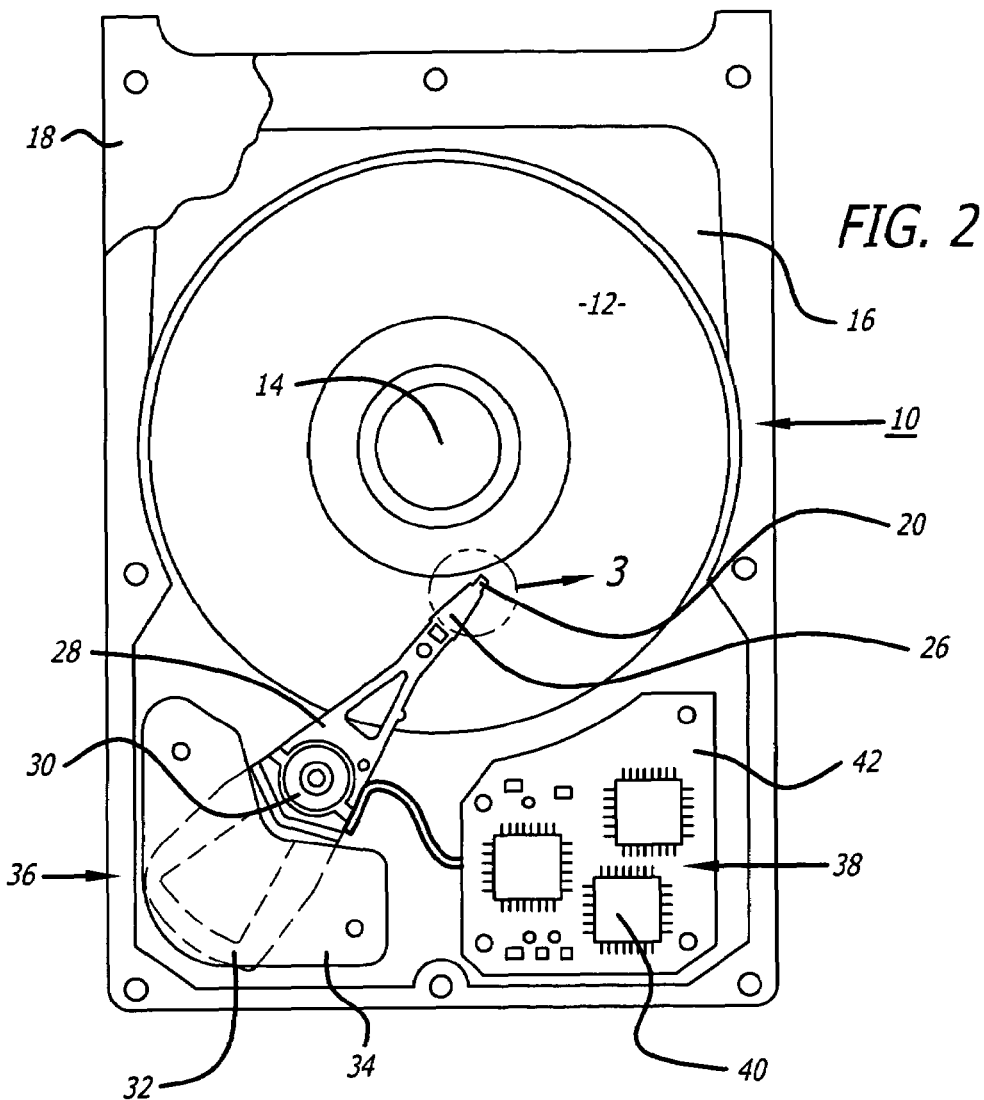
FIG. 2 is a top view of an embodiment of a hard disk drive.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
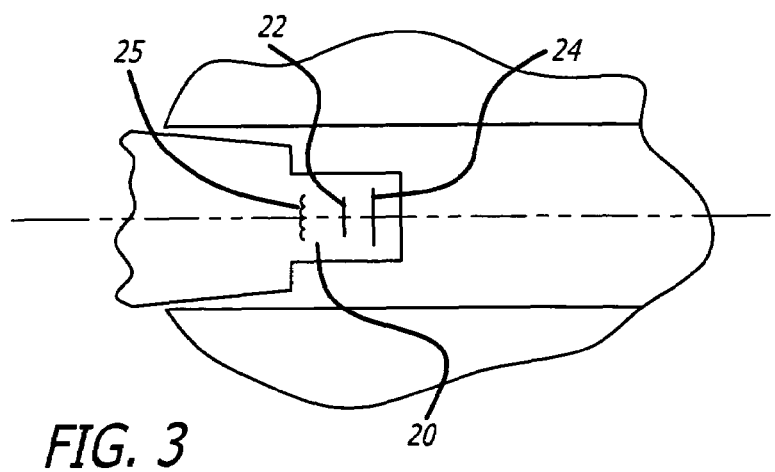
FIG. 3 is a top enlarged view of a head of the hard disk drive.

The disk drive 10 may include a plurality of heads 20 located adjacent to the disks 12. As shown in FIG. 3 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The heads 20 also contain a heater coil 25. Current can be provided to the heater coil 25 to generate heat within the head 20. The heat thermally expands the head 20 and moves the read 24 and write 22 elements closer to the disk.

Referring to FIG. 2, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 4:
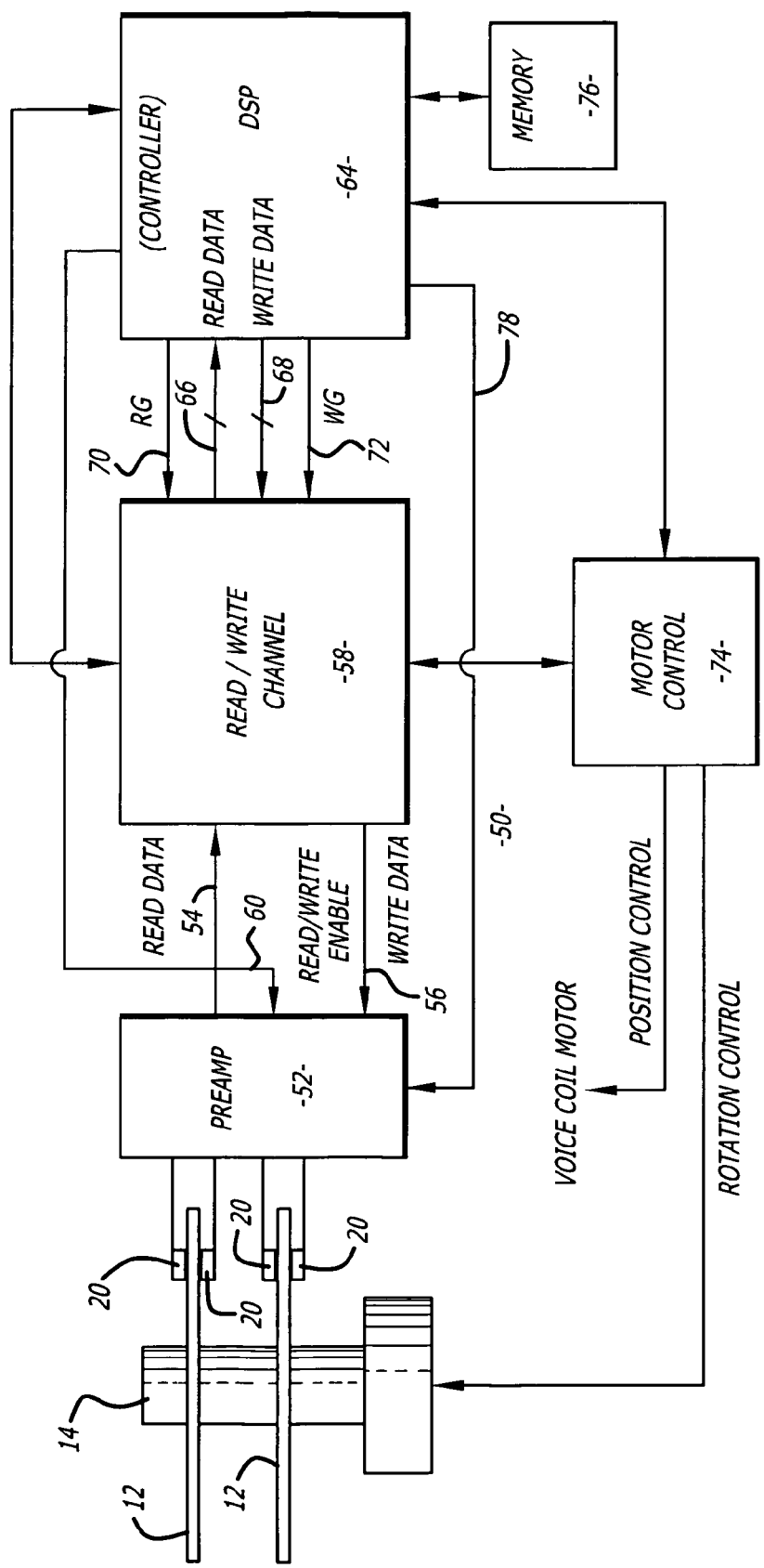
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

The controller 64 may be connected to the heater coil 25 of each head by line(s) 78 and the preamplifier circuit 52. The controller 64 can provide a current to the heater coil 25 to control the flying height of the head.

Figure 5:
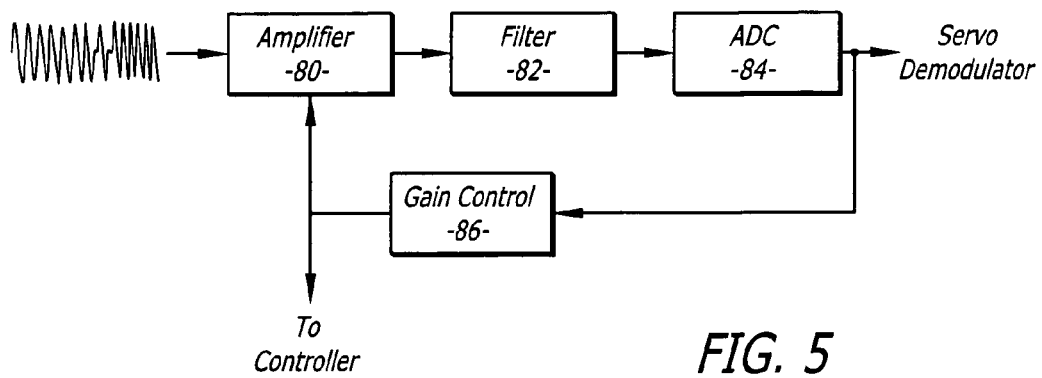
FIG. 5 is a schematic of a read channel of the electrical circuit.

FIG. 5 is a schematic showing functional blocks of a read channel and pre-amp of the disk drive. The read channel includes an amplifier 80 coupled to a head(s)(not shown). The amplifier 80 adjusts the amplitude of a signal read by the head. The amplified signal is filtered by filter 82 and converted to a digital bit string by an analog to digital ("ADC") converter 84.

The gain of the amplifier 80 is adjusted by an automatic gain control circuit 86. The automatic gain control circuit 86 receives as input the digital output of the ADC 84 and provides an analog control signal to the amplifier 80. The analog control signal is commonly referred to as the servo amplifier gain control (SAGC) signal.

The control signal is inversely proportional to the amplitude of the read signal. A weak signal will result in a larger control signal. A larger control signal will increase the gain of the automatic gain control circuit and boost the amplitude of the read signal. The signal read by the head is inversely proportional to the head fly height. Consequently, the control signal is proportional to the fly height. A larger control signal is indicative of an increasing fly height.

Figure 6:
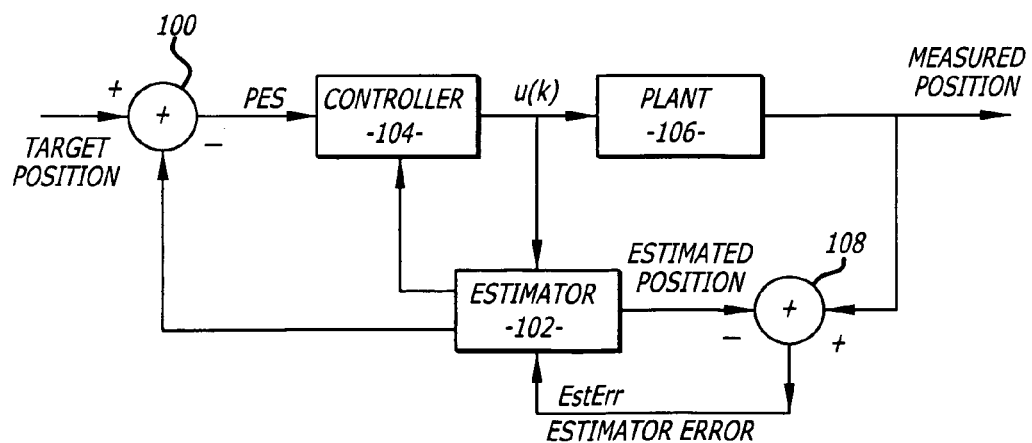
FIG. 6 is a schematic of a servo loop for the hard disk drive.

FIG. 6 is a schematic showing functional blocks of a servo routine used to control the position of the heads. The routine includes a junction 100 that sums a target head position with the output of an estimator 102. The output of the junction is a position error signal (PES) that is provided to a servo controller 104. The servo controller 104 provides a drive signal u(k) to the plant 106, which includes the voice coil motor, actuator arm, etc. Another summing junction 108 sums a measured position of the head(s) and an estimated position provided by the estimator 102. The output of the junction 108 is an estimator error value EstErr.

Figure 7:
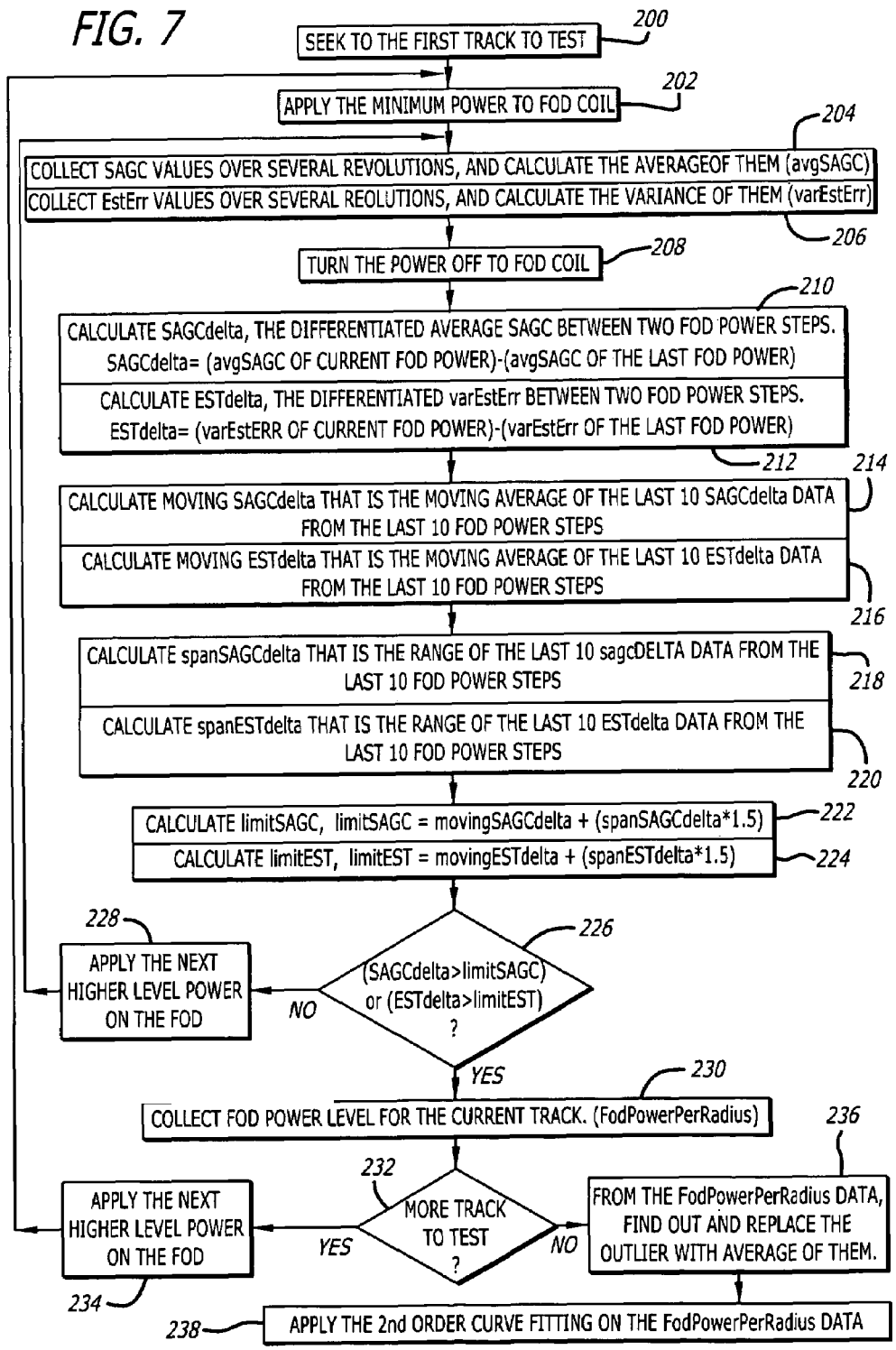
FIG. 7 is a flowchart showing a process for collecting data and performing calculations to obtain data that can be used to determine contact between a head and a disk.

Data for determining contact between a head and a disk can be compiled using the process shown in FIG. 7. The head is moved to the first track position on the disk in block 200. Power is provided to the heater coil of the head in block 202. In block 204 a plurality of SAGC values are collected during several revolutions of the disk and an average of the SAGC values is computed. In block 206 a plurality of estimator error values are collected during several revolutions of the disks and a variance of the estimator error values is computed. The estimator error values may be computed in accordance with the following equation:

$$stdEstErr(Vrss) = \sqrt{\frac{1}{N}\sum_{i=1}^{N}\left\{EstErr(i) - \frac{1}{N}\sum_{k=1}^{N}EstErr(k)\right\}^2}$$

Where;
  Vrss=the voltage to the heater coil.
  N=the number of collected estimator error values.
  EstErr(i)=the ith estimator error collected.

Power to the heater coil is terminated in block 208. In block 210, a delta SAGC value is computed as the difference between the average SAGC value at the current power level and the average SAGC value at the last power level. Likewise, in block 212 a delta Est may be computed as the difference between the error estimate variance between the most recent power levels.

In block 214 a moving SAGCdelta value may be computed as the moving average of SAGC delta values for n previous power levels. A moving ESTdelta value may be computed as the moving average of EST delta values for n previous power levels in block 216.

In block 218 a spanSAGCdelta value can be calculated that is the range of the last n number of SAGCdelta values. A spanESTdelta value can be calculated that is the range of the last n number of spanESTdelta values in block 220.

A LimitSAGC can be calculated as the sum of the moving-SAGCdelta and 1.5 times the spanSAGCdelta value in block 222. In block 224 a LimitEST can be calculated as the sum of movingESTdelta and 1.5 times spanESTdelta.

In decision block 226 it is decided whether SAGCdelta is greater than limitSAGC, or ESTdelta is greater than limitEST. If neither is satisfied the power level is increased in block 228 and the process returns to block 204. If either operation is satisfied then the process proceeds to block 230 where the power level is stored.

Decision block 232 determines whether the head is at the last track. If not, the head is moved to the next track in block 234 and the process moves to block 202. If the head is at the last track then the average of the SAGC ave replaces a previous value in block 236. A second order curve fit may be performed on the data in block 238. The routine shown in FIG. 7 may be performed by the controller 64 in accordance with data and operations stored in memory. The data and operations may be structured as a routine(s) performed by the controller 64 and/or an external processor.

Figure 1:
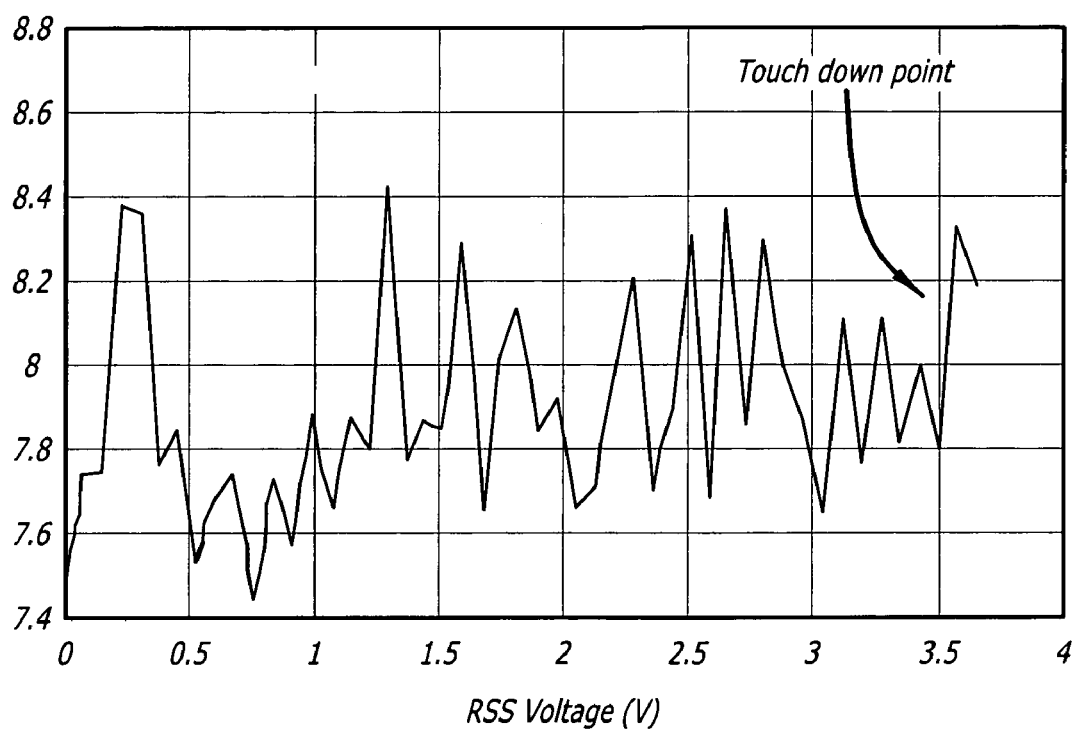
FIG. 1 is a graph showing PES versus voltage applications to a head heating element for a prior art technique used to determine a point of head contact.
Figure 8:
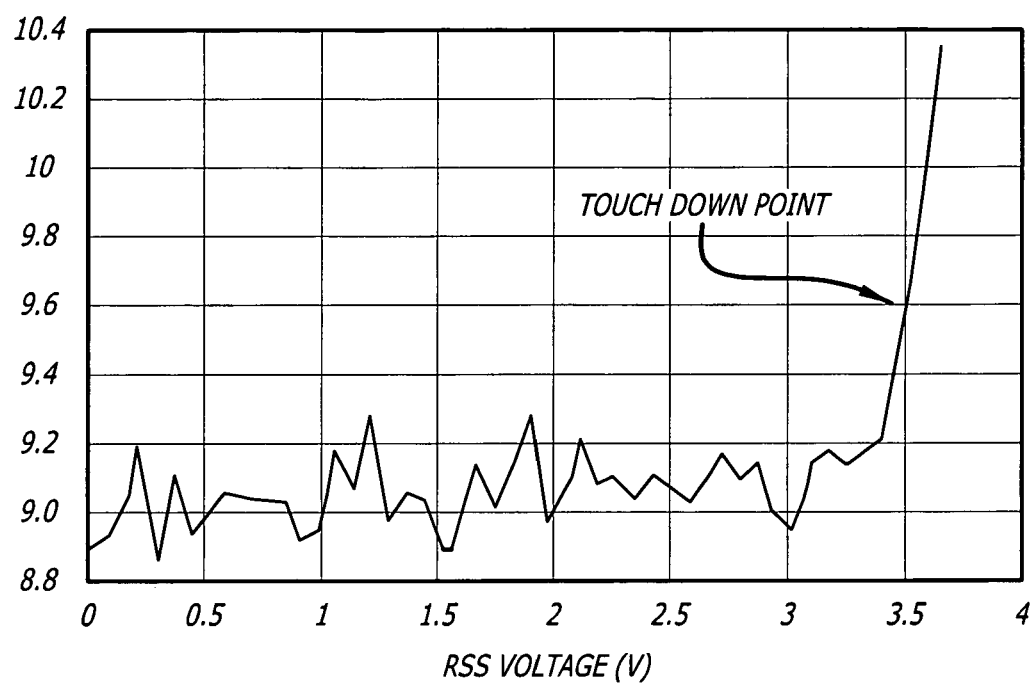
FIG. 8 is a graph showing variance values for head position estimate errors versus power levels to a heating coil of the head.
Figure 9:
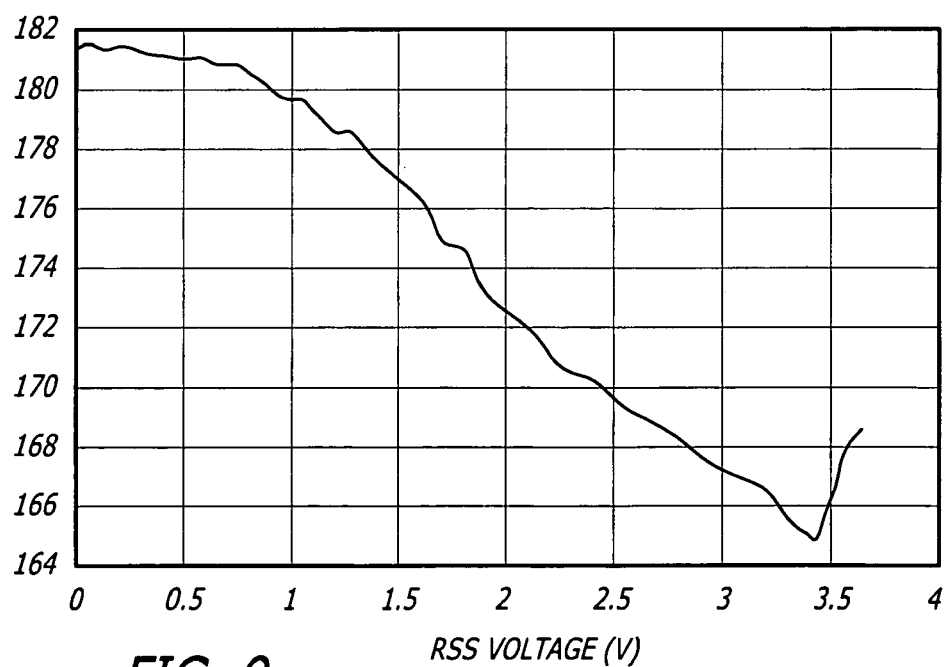
FIG. 9 is a graph showing average SAGC values versus power levels to a heating coil of a head.

FIG. 8 shows a graph of different variance values for different heating coil voltage. The variance data provides a sharp transition point at which the head makes contact with the disk. FIG. 9 shows average SAGC values versus coil voltages. This data also provides a sharp transition point where the head makes contact with the disk. These graphs are to be distinguished from the prior art shown in FIG. 1 which has a variety of transition points and is thus difficult to determine the exact contact point.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk, said head having a write element, a read element and a heater coil;
   a voice coil motor coupled to said head; and,
   a controller circuit coupled to said head and said voice coil motor, said controller circuit provides power to said heater coil and performs a routine that collects estimated error data and determines a variance value of said estimated error data to determine a point of contact between said head and said disk.

2. The disk drive of claim 1, wherein the estimated error data includes a sum of an estimated head position and a measured head position.

3. The disk drive of claim 1, wherein said controller circuit determines a variance value for estimated error data relative to a plurality of power levels supplied to said heater coil.

4. The disk drive of claim 3, wherein said controller determines a delta between a variance value at a first power level and a variance value at a second power level.

5. The disk drive of claim 3, wherein said variance values and said power levels are plotted.

6. The disk drive of claim 1, wherein said variance value is computed in accordance with the following equation:

$$stdEstErr(Vrss) = \sqrt{\frac{1}{N}\sum_{i=1}^{N}\left\{EstErr(i) - \frac{1}{N}\sum_{k=1}^{N}EstErr(k)\right\}^2}$$

where:
   Vrss=the voltage to the heater coil;
   N=the number of collected estimator error values;
   EstErr(i)=the ith estimator error collected;
   EstErr(k)=the kth estimator error collected.

7. A hard disk drive, comprising;
   a disk;
   a head coupled to said disk, said head having a write element and a heater coil;
   a voice coil motor coupled to said head; and,
   circuit means for providing power to said heater coil and performing a routine for collecting estimated error data and determining a variance value of said estimated error data for determining a point of contact between said head and said disk.

8. The disk drive of claim 7, wherein said estimated error data includes a sum of an estimated head position and a measured head position.

9. The disk drive of claim 7, wherein said circuit means determines a variance value for estimated error data relative to a plurality of power levels supplied to said heater coil.

10. The disk drive of claim 9, wherein said circuit means determines a delta between a variance value at a first power level and a variance value at a second power level.

11. The disk drive of claim 9, wherein said variance values and said power levels are plotted.

12. The disk drive of claim 7, wherein said standard deviation value is computed in accordance with the following equation:

$$stdEstErr(Vrss) = \sqrt{\frac{1}{N}\sum_{i=1}^{N}\left\{EstErr(i) - \frac{1}{N}\sum_{k=1}^{N}EstErr(k)\right\}^2}$$

where:
   Vrss=the voltage to the heater coil;
   N=the number of collected estimator error values;
   EstErr(i)=the ith estimator error collected;
   EstErr(k)=the kth estimator error collected.

13. An apparatus that contains a program for a hard disk drive, the hard disk drive having a disk, and a head that includes a write element, a read element and a heater coil, comprising:
   a program storage medium that contains a program which causes a controller to provide power to the heater coil and perform a routine that collects estimated error data and determines a variance value of said estimated error data to determine a point of contact between the head and the disk.

14. The apparatus of claim 13, wherein the variance data includes a sum of an estimated head position and a measured head position.

15. The apparatus of claim 13, wherein the program causes the controller to determine a variance value for estimated error data relative to a plurality of power levels supplied to the heater coil.

16. The apparatus of claim 15, wherein program causes the controller to determine a delta between a variance value at a first power level and a variance value at a second power level.

17. The apparatus of claim 15, wherein the variance values and the power levels are plotted.

18. The apparatus of claim 13, wherein the variance value is computed in accordance with the following equation:

$$stdEstErr(Vrss) = \sqrt{\frac{1}{N}\sum_{i=1}^{N}\left\{EstErr(i) - \frac{1}{N}\sum_{k=1}^{N}EstErr(k)\right\}^2}$$

where:
   Vrss=the voltage to the heater coil;
   N=the number of collected estimator error values;
   EstErr(i)=the ith estimator error collected;
   EstErr(k)=the kth estimator error collected.

19. A method to determine contact between a head and a disk of a hard disk drive, comprising:
   providing power to a heater coil of the head; and,
   performing a routine that collects estimated error data and determines a variance value of the estimated error data to determine a point of contact between the head and the disk.

20. The method of claim 19, wherein the estimated error data includes a sum of an estimated head position and a measured head position.

21. The method of claim 19, further comprising determining a variance value for estimated error data relative to a plurality of power levels supplied to the heater coil.

22. The method of claim 21, further comprising determining a delta between a variance value at a first power level and a variance value at a second power level.

23. The method of claim 21, wherein the variance deviation values and the power levels are plotted.

24. The method of claim 19, wherein the variance value is computed in accordance with the following equation $$stdEstErr(Vrss) = \sqrt{\frac{1}{N}\sum_{i=1}^{N}\left\{EstErr(i) - \frac{1}{N}\sum_{k=1}^{N}EstErr(k)\right\}^2}$$

where:
Vrss=the voltage to the heater coil;
N=the number of collected estimator error values;
EstErr(i)=the ith estimator error collected;
EstErr(k)=the kth estimator error collected.

25. A hard disk drive, comprising:
a disk;
a head coupled to said disk, said head having a write element, a read element and a heater coil;
an amplifier coupled to said head;
an automatic gain control circuit coupled to said amplifier, said automatic gain control circuit generates a servo amplifier gain control SAGC signal;
a voice coil motor coupled to said head; and,
a controller circuit coupled to said head and said voice coil motor, said controller circuit provides power to said heater coil and performs a routine that collects a plurality of SAGC values and determines an average of said SAGC values to determine a point of contact between said head and said disk.

26. The disk drive of claim 25, wherein said controller determines an average of SAGC values relative to a plurality of power levels supplied to said heater coil.

27. The disk drive of claim 26, wherein said controller determines a delta between an average of SAGC values at a first power level and an average of SAGC values at a second power level.

28. The disk drive of claim 26, wherein said average SAGC values and said power levels are plotted.

29. A hard disk drive, comprising:
a disk;
a head coupled to said disk, said head having a write element, a read element and a heater coil;
an amplifier coupled to said head;
an automatic gain control circuit coupled to said amplifier, said automatic gain control circuit generates a servo amplifier gain control SAGC signal;
a voice coil motor coupled to said head; and,
circuit means for providing power to said heater coil and performing a routine that collects a plurality of SAGC values and determines an average of said SAGC values to determine a point of contact between said head and said disk.

30. The disk drive of claim 29, wherein said circuit means determines an average of SAGC values relative to a plurality of power levels supplied to said heater coil.

31. The disk drive of claim 30, wherein said circuit means determines a delta between an average of SAGC values at a first power level and an average of SAGC values at a second power level.

32. The disk drive of claim 30, wherein said average SAGC values and said power levels are plotted.

33. An apparatus that contains a program for a hard disk drive, the hard disk drive having a disk, and a head that includes a write element, a read element and a heater coil, comprising:
a program storage medium that contains a program which causes a controller to provide power to the heater coil and perform a routine that collects a plurality of SAGC values and determines an average of said servo amplifier gain control SAGC values to determine a point of contact between the head and the disk.

34. The apparatus of claim 33, wherein said program causes the controller to determine an average of SAGC values relative to a plurality of power levels supplied to the heater coil.

35. The apparatus of claim 34, wherein said program causes the controller to determine a delta between an average of SAGC values at a first power level and an average of SAGC values at a second power level.

36. The apparatus of claim 34, wherein said average SAGC values and the power levels are plotted.

37. A method to determine contact between a head and a disk of a hard disk drive, comprising:
providing power to a heater coil of the head; and,
performing a routine that collects a plurality of servo amplifier gain control SAGC values and determine an average of the SAGC values to determine a point of contact between the head and the disk.

38. The method of claim 37, further comprising determining an average of SAGC values relative to a plurality of power levels supplied to the heater coil.

39. The method of claim 38, further comprising determining a delta between an average of SAGC values at a first power level and an average of SAGC values at a second power level.

40. The method of claim 39, wherein the average SAGC values and the power levels are plotted.

* * * * *